United States Patent [19]

Parsons

[11] Patent Number: 4,886,855
[45] Date of Patent: Dec. 12, 1989

[54] POLYMER BLENDS OF POLYCARBONATE STYRENE TERPOLYMER AND ABS RESIN

[75] Inventor: Charles F. Parsons, Little Hocking, Ohio

[73] Assignee: Borg-Warner Chemicals, Inc., Parkersburg, W. Va.

[21] Appl. No.: 165,462

[22] Filed: Mar. 8, 1988

[51] Int. Cl.$^4$ .................. C08L 69/00; C08L 55/02; C08L 31/02; C08L 35/06
[52] U.S. Cl. ................................ 525/67; 525/148
[58] Field of Search .......................... 525/67, 148

[56] References Cited

U.S. PATENT DOCUMENTS

| | | | |
|---|---|---|---|
| 4,569,969 | 2/1986 | Jones et al. | 525/67 |
| 4,594,387 | 6/1986 | Muramatsu et al. | 525/67 |
| 4,683,265 | 7/1987 | Kress et al. | 525/67 |
| 4,705,827 | 11/1987 | Kodama et al. | 525/148 |

*Primary Examiner*—John C. Bleutge
*Assistant Examiner*—Susan Berman
*Attorney, Agent, or Firm*—Lowe, Price, LeBlanc, Becker & Shur

[57] ABSTRACT

Polymer blend compositions comprise polycarbonate, styrene-acrylonitrile-maleic anhydride terpolymer and ABS resin. The ABS resin is included in the blends in amounts less than 20 weight percent and contains at least 40 weight percent of a diene rubber substrate. The blends exhibit high heat deflection temperatures and good impact strength and modulus.

7 Claims, No Drawings

POLYMER BLENDS OF POLYCARBONATE STYRENE TERPOLYMER AND ABS RESIN

FIELD OF THE INVENTION

The present invention relates to polymer blend compositions containing polycarbonate, a styrene terpolymer and ABS resin. More particularly, the invention relates to blend compositions of polycarbonate, styrene-acrylonitrile-maleic anhydride terpolymer and ABS resin which exhibit high heat deflection temperatures and good impact strength and modulus.

BACKGROUND OF THE INVENTION

Polymer blend compositions for use in engineering applications should exhibit a combination of heat resistance, good impact strength and good modulus. Additionally, the blend compositions should exhibit good melt flow properties which facilitate processing and molding of the blend compositions. Polycarbonates are popular blend components owing to their toughness and relatively high softening temperatures. However, owing to their relatively poor melt flow characteristics, polycarbonates are often blended with one or more additional polymers to improve the melt flow properties. While the resulting blends generally exhibit improved melt flow properties, other properties such as heat resistance, impact strength and the like are reduced.

Examples of such blend compositions are known. For example, the Grabowski U.S. Pat. No. 3,130,177 discloses blends of polycarbonates with polybutadiene, styrene, acrylonitrile graft polymers while the Grabowski U.S. Pat. No. 3,162,695 discloses blends of polycarbonates with butadiene-styrene, methyl methacrylate, styrene graft copolymers. The Liebig et al U.S. Pat. No. 4,205,140 discloses a thermoplastic molding composition comprising a blend of a polycarbonate, a diene rubber graft polymer such as ABS, and a styrene polymer. Similar blends of polycarbonate with styrene-maleic anhydride copolymer, ABS resin and styrene-acrylonitrile random copolymer are disclosed in the Henton U.S. Pat. No. 4,218,544. The Grigo et al U.S. Pat. No. 4,472,554 discloses thermoplastic molding compositions comprising a blend of a polycarbonate, a graft polymer such as ABS and a polymeric acidifying agent. European Patent Applications Nos. 135,492 and 135,493 also disclose polymer blends of polycarbonates, ABS polymers and styrene polymers. These blends exhibit various physical properties depending on the type and ratio of components included therein.

SUMMARY OF THE INVENTION

Accordingly, it is an object of the present invention to provide polymer blend compositions which exhibit an advantageous combination of physical properties including heat resistance, impact strength, modulus and flow properties. It is an additional object of the invention to provide polymer blend compositions which exhibit a combination of heat resistance, impact strength and modulus which allows the blends to be used in engineering thermoplastic blend applications. It is a further object of the invention to provide polymer blend compositions which exhibit good melt flow properties which facilitate processing and molding of the compositions.

These and additional objects are provided by the blend compositions of the present invention which comprise in combination polycarbonate, styrene-acrylonitrile-maleic anhydride terpolymer and ABS resin. More specifically, the blend compositions of the invention include from about 4 to less than 20 weight percent of ABS resin, based on the total weight of the polycarbonate, the terpolymer and the ABS resin. The ABS resin comprises a rigid graft polymer grafted to a diene rubber substrate and contains at least 40 weight percent of the diene rubber substrate. The ABS resin serves as a blending compatibilizer between the polycarbonate and the styrene terpolymer resulting in retention of the impact strength of the polycarbonate, the rigidity of the styrene terpolymer and the heat resistance of both the polycarbonate and the styrene terpolymer. If the amount of ABS resin is increased above about 20 weight percent, the resulting blends exhibit an increasing deficiency in modulus and heat resistance. However, the blends according to the present invention containing less than 20 weight percent ABS resin exhibit an advantageous combination of impact strength, heat resistance and modulus. These blends also exhibit good melt flow properties which facilitate their processing and molding.

These and additional objects and advantages provided by the blend compositions of the present invention will become more apparent in view of the following detailed description.

DETAILED DESCRIPTION

The polymer blend compositions of the invention comprise polycarbonate, styrene-acrylonitrile-maleic anhydride terpolymer and ABS resin. The blend compositions exhibit a unique and advantageous combination of heat distortion temperatures, good impact strength and good modulus. The blends also exhibit flow properties which facilitate processing and molding of the compositions.

The polycarbonate component included in the blend compositions may be any aromatic homo-polycarbonate or co-polycarbonate known in the art. The polycarbonate component may be prepared in accordance with any of the processes generally known in the art, for example, by the interfacial polycondensation process, polycondensation in a homogeneous phase or by transesterification. These processes and the associated reactants, catalysts, solvents and conditions are well known in the art and are described in U.S. Pat. Nos. 2,964,974; 2,970,137; 2,999,835; 2,999,846; 3,028,365; 3,153,008; 3,187,065; 3,215,668; and 3,258,414, all of which are incorporated herein by reference. Suitable polycarbonates are based, for example, on one or more of the following bisphenols: dihydroxy diphenyls, bis-(hydroxyphenyl)-alkanes, bis-(hydroxyphenyl)-cycloalkanes, bis-(hydroxyphenyl)sulphides, bis-(hydroxyphenyl)-ethers, bis-(hydroxyphenyl)-ketones, bis-(hydroxyphenyl)-sulphoxides, bis-(hydroxyphenyl)-sulphones, α,α-bis-(hydroxyphenyl)diisopropyl benzenes, and their nucleus-alkylated and nucleus-halogenated derivatives, and mixtures thereof.

Specific examples of these bisphenols are 4, 4'-dihydroxy diphenyl, 2, 2-bis-(4-hydroxyphenyl)-propane, 2, 4-bis-(4-hydroxyphenyl)-2-methyl butane, 1, 1-bis-(4-hydroxyphenyl) -cyclohexane, α,α-bis-(4-hydroxyphenyl)-pdiisopropyl benzene, 2, 2-bis(3-methyl-4-hydroxyphenyl)propane, 2, 2-bis-(3-chloro-4-hydroxyphenyl)-propane, bis(3, 5-dimethyl-4-hydroxyphenyl)-methane, 2, 2-bis-(3,5-dimethyl-4-hydroxyphenyl)-propane, bis-(3, 5-dimethyl-4-hydroxyphenyl)-sulphone, 2, 4-bis-(3, 5-dimethyl-4-hydroxyphenyl)-2-methyl butane, 1, 1-bis-(3, 5-dimethyl-4-hydroxyphenyl)-cyclohexane, α,α-bis-(3, 5-dimethyl-4-hydroxyphenyl)-p-diisopropyl benzene, 2, 2-bis-(3, 5-dichloro-4-hydroxyphenyl)-propane and 2, 2-bis-(3, 5-dibromo-4-hydroxyphenyl)-propane. A particular preferred bisphenol is 2, 2-bis-(4-hydroxyphenyl)-propane, more commonly known as bisphenol A.

The polycarbonate component is included in the blend compositions in an amount sufficient to provide the blend compositions with good impact strength and good heat resistance. Preferably, the polycarbonate component is included in an amount of from about 15 to about 65 weight percent based on the total weight of the polycarbonate, the terpolymer and the ABS resin.

The second component included in the blend compositions comprises a styrene-acrylonitrile-maleic anhydride terpolymer. Preferably, styrene comprises a majority of the terpolymer composition whereby the terpolymer provides the resultant blend composition with rigidity, good modulus and heat resistance. The maleic anhydride is included in the terpolymer in an amount sufficient to enhance the properties of the styrene component. Preferably, the maleic anhydride comprises from about 8 to about 25 weight percent of the terpolymer. Additionally, the acrylonitrile component of the terpolymer is preferably used in an amount not greater than about 20 weight percent in order that the blend compositions exhibit good melt stability and therefore good processing and molding properties. More preferably, from about 7 to about 20 weight percent acrylonitrile is included in the terpolymer.

The terpolymer is preferably formed in a continuous polymerization process as is well known in the art. In practice, the preparation of the styrene-acrylonitrile-maleic anhydride terpolymer may be controlled to form a product comprising a mixture of the terpolymer and styrene-acrylonitrile copolymer. This mixture of the terpolymer and the copolymer which may result during the production of the terpolymer may also be used in the blend component compositions of the invention as is set forth in the examples.

The styrene-acrylonitrile-maleic anhydride terpolymer is used in an amount sufficient to provide the blends with good rigidity, good modulus and high heat resistance, particularly as indicated by the heat deflection temperature. Preferably, the terpolymer is used in an amount of from about 25 to about 75 weight percent based on the total weight of the polycarbonate, the terpolymer and the ABS resin.

The third component of the blend compositions of the invention comprises an ABS resin. The ABS resin is used in an amount sufficient to effect compatibilization between the polycarbonate and the styrene terpolymer components whereby the resultant blend compositions retain the impact strength of the polycarbonate component, the rigidity and good modulus of the styrene terpolymer component and the heat resistance of both the polycarbonate and the terpolymer components. It has been discovered that in order to increase the compatibilization of the polycarbonate and terpolymer components without disadvantageously effecting the properties of the blend components, the ABS resin should be used in an amount less than 20 weight percent based on the total weight of the polycarbonate, the terpolymer and the ABS resin. In order to effect compatibilization, the ABS resin should also be used in an amount of at least about 4 weight percent. In a preferred embodiment, the ABS resin is used in an amount of from about 4 to about 19 weight percent.

The ABS resin comprises a rigid graft polymer grafted to a diene rubber substrate. In a preferred embodiment, the rigid graft polymer is formed from styrene and acrylonitrile and the diene rubber substrate comprises polybutadiene. However, it is well within the scope of the present invention to employ an ABS resin in which the rigid polymer is formed from a monovinylidene aromatic monomer other than styrene and acrylate or methacrylate monomers other than acrylonitrile as is well known in the art. Additionally, the ABS resin may include diene rubbers other than polybutadiene as is well known in the art. In the context of the present application, reference to the ABS resin component will also include these equivalent polymers. It is noted however that ABS resin comprising a rigid graft polymer comprising styrene and acrylonitrile grafted to polybutadiene is the preferred ABS resin. In this preferred embodiment, it is further preferred that the weight ratio of styrene to acrylonitrile in the rigid graft portion of the ABS resin is in the range of about 1:1 to about 5:1 so that the amount of styrene is equal to or greater than the amount of acrylonitrile included in the graft portion. The ABS resin component may be prepared according to methods also well known in the art. As is known in the art, methods of producing ABS resin may result in a product comprising a mixture of ABS graft and ungrafted styrene-acrylonitrile copolymer. These mixtures are also suitable for use in the invention.

The ABS resin should contain at least 40 weight percent, and preferably 50 weight percent, of the diene rubber substrate in order to effect blending compatibilization between the polycarbonate and the terpolymer components. In a preferred embodiment, the ABS resin comprises from about 50 to about 75 weight percent of the diene rubber substrate, and more preferably about 60 to about 70 weight percent.

The blend compositions of the invention may be produced in conventional mixing and compounding apparatus including, for example, twin-screw extruders, mixing rolls and internal mixers. The blend compositions may also include various conventional additives including stabilizers, lubricants, flow aids, flame proofing agents, mold release agents, antistatic agents, fillers, glass fibers, pigments and the like.

The following examples further illustrate specific embodiments of the invention. Unless otherwise specified, percentages set forth throughout the examples are weight percentages. The polycarbonate (PC), styrene-acrylonitrile-maleic anhydride terpolymers (SAMA) and the ABS resins which were used in the examples are described as follows:

PC: Merlon M50 polycarbonate from Mobay Chemical Company.

SAMA-1: This component contained approximately 21-22 percent maleic anhydride and was prepared under steady state conditions in a single reactor. The feed percentages to the reactor were approximately 81 percent styrene monomer, 9 percent acrylonitrile monomer and 10 percent maleic anhydride monomer. Polymerization was initiated thermally and conversion of monomer to polymer was approximately 50 percent. The resulting warm mass was pumped continuously to a vacuum extruder where unreacted styrene monomer and acrylonitrile monomer were removed and recycled to the reactor. The resultant terpolymer product contained substantially no styrene-acrylonitrile copolymer as indicated by the absence of a Tg at 104°–108° C.

SAMA-2: This component contained approximately 10–11 weight percent maleic anhydride and was prepared by conducting the monomer containing product resulting in the preparation of SAMA-1 to a second reactor where additional polymerization of the unreacted styrene monomer and acrylonitrile monomer occurred. The resultant product contained less than about 50 percent styrene-acrylonitrile copolymer as indicated by measurement of 2 Tg's.

SAMA-3: This component was prepared in a manner similar to that of SAMA-2 except that the feed of maleic anhydride to the reactor was reduced by one-half. The product contained approximately 4 percent maleic anhydride and included a styrene-acrylonitrile copolymer content in the range of about 30 to 80 weight percent.

SAMA-4: This component contained 2 weight percent maleic anhydride and was prepared in the manner set forth for SAMA-3 except that the maleic anhydride feed was half of that used in the preparation of SAMA-3. The component contained 40 to 80 percent by weight of styrene-acrylonitrile copolymer.

ABS-1: This component comprised 30 parts by weight styrene-acrylonitrile in a 3:1 weight ratio grafted to 70 parts by weight of polybutadiene substrate.

ABS-2: This component comprised 50 parts by weight styrene-acrylonitrile in a 2.5:1 weight ratio grafted to 50 parts by weight polybutadiene substrate.

ABS-3: This component comprised 50 parts by weight styrene-acrylonitrile in a 35:15 weight ratio grafted on 50 parts by weight polybutadiene substrate.

ABS-4: This component comprised 40 parts by weight styrene-acrylonitrile in a 28:12 weight ratio grafted on 60 parts by weight polybutadiene substrate.

ABS-5: This component comprised 50 parts by weight styrene-acrylonitrile in a 3:1 weight ratio grafted on 50 parts by weight polybutadiene substrate.

EXAMPLE 1

Blend compositions were prepared according to the invention including polycarbonate (PC), SAMA-1 and ABS-1. The weight percentages of the blend components are set forth in Table I. The blend compositions of this and the following examples were prepared by melt mixing the polycarbonate, SAMA pellets and ABS powder in a Banbury mixer. The hot mass was stripped from a two-roll mill and granulated. The granules were dried and injection molded into test specimens. The molding temperature was between 475° and 500° F. Each blend also contained 0.5 phr of each of Pluronic F-88 (BASF Corporation) and magnesium stearate.

The blend compositions of this example and the following examples were subjected to measurement of Izod Impact strength according to ASTM-D256. Unannealed injection molded samples of a 1/8-inch thickness of the blend compositions of this example and the following examples were also subjected to measurement of the heat deflection temperature according to ASTM-D648. The results of these measurements on the blend compositions of this example are set forth in Table I.

TABLE I

|  | A | B | C | D | E | F | G |
|---|---|---|---|---|---|---|---|
| PC | 50 | 40 | 40 | 30 | 30 | 20 | 50 |
| SAMA-1 | 40 | 45 | 50 | 55 | 60 | 65 | 50 |
| ABS-1 | 10 | 15 | 10 | 15 | 10 | 15 | — |
| Izod Impact Strength, ft-lb/inch, room temperature | 19.2 | 25.4 | 15.8 | 26.1 | 14.3 | 10.4 | 1.1 |
| Heat Deflection Temperature, ¼-inch, Injection Molded, 264 psi, °F. | 232 | 232 | 230 | 228 | 227 | 227 | 235 |

As set forth in Table I, compositions A–F are according to the present invention wherein the content of the ABS resin is less than 20 weight percent. Additionally, in blends A–F the content of the polycarbonate varies from 20–50 weight percent and the content of the styrene terpolymer varies from 40–65 weight percent. Blend composition G is a comparative blend composition wherein no ABS resin is included. The Izod Impact strength measurements set forth in Table I indicate that the inclusion of the ABS resin provides blend compositions with improved impact strength as compared with composition G containing only polycarbonate and styrene terpolymer. Additionally, the heat deflection temperature measurements indicate that since the ABS resin is included in relatively low amounts, namely, less than 20 weight percent, the heat deflection temperature of the blends according to the present invention is not substantially effected.

EXAMPLE 2

In this example, blend compositions were prepared using polycarbonate (PC), SAMA-2 and one of ABS-1, ABS-2 and ABS-3. The weight percentages of the components included in the blends are set forth in Table II. The resultant blend compositions were subjected to measurement of Izod Impact strength and heat deflection temperature as set forth in Example 1. Additionally, the compositions were subjected to measurement of flexural strength and flexural modulus according to ASTM-D790. The results of these measurements are also set forth in Table II.

TABLE II

|  | A | B | C | D | E | F | G | H | I |
|---|---|---|---|---|---|---|---|---|---|
| PC | 65 | 50 | 40 | 65 | 50 | 40 | 65 | 50 | 40 |
| SAMA-2 | 23 | 38 | 48 | 18 | 33 | 43 | 18 | 33 | 43 |
| ABS-1 | 12 | 12 | 12 | — | — | — | — | — | — |
| ABS-2 | — | — | — | 17 | 17 | 17 | — | — | — |
| ABS-3 | — | — | — | — | — | — | 17 | 17 | 17 |
| Izod Impact Strength, ft-lb/inch, room temperature | 13.1 | 23.9 | 16.2 | 13.3 | 12.1 | 18.5 | 12.3 | 11.7 | 8.6 |
| 0° F. | 10.6 | 10.8 | 2.7 | 10.7 | 11.6 | 9.6 | 10.7 | 9.4 | 11.1 |
| Flexural Strength, psi | 12110 | 12590 | 12775 | 11500 | 12000 | 12205 | 11945 | 12315 | 12535 |
| Flexural |  |  |  |  |  |  |  |  |  |

TABLE II-continued

|  | A | B | C | D | E | F | G | H | I |
|---|---|---|---|---|---|---|---|---|---|
| Modulus, psi × 100,000 | 3.3 | 3.6 | 3.6 | 3.2 | 3.6 | 3.6 | 3.3 | 3.6 | 3.6 |
| Heat Deflection Temperature, ⅛-inch, Injection Molded, 264 psi, °F. | 219 | 217 | 206 | 216 | 211 | 211 | 219 | 215 | 210 |

The Izod Impact strength measurements set forth in Table II indicate that the blend compositions according to the present invention including polycarbonate, the styrene terpolymer and less than 20 weight percent ABS resin exhibit good impact strength, particularly at room temperature, although the measurements at 0° F. also indicate good impact strength at lower temperatures. The heat deflection temperature measurements set forth in Table II also indicate that the blend compositions of the invention exhibit significantly high heat deflection temperatures and good heat resistance. The flexural strength and flexural modulus properties set forth in Table II illustrate additional advantageous properties of the blend compositions according to the invention. The good flexural strength and flexural modulus properties in combination with the good impact strength properties and high heat deflection temperatures exhibited by the blends of the invention allow these compositions to be used in various applications.

EXAMPLE 3

This example compares polymer blend compositions according to the present invention with polymer blends containing greater than 20 weight percent ABS resin. Specifically, blends A, B and C were prepared according to the present invention and include polycarbonate, SAMA-2, SAMA-3 or SAMA-4, and ABS-5, with the amount of ABS-5 being 10 weight percent of the total weight of polycarbonate, terpolymer and ABS resin. In contrast, blend compositions D-E and F include a greater amount of ABS-5, namely 30 weight percent, and smaller amounts of the styrene terpolymer component. Blend composition G was prepared including polycarbonate and SAMA-2 without any ABS resin. The weight percentages of the components in the blends of this example are set forth in Table III. These blend compositions were subjected to measurement of Izod Impact strength and heat deflection temperature, as set forth in Example 1. The results of these measurements are also set forth in Table III.

TABLE III

|  | A | B | C | D | E | F | G |
|---|---|---|---|---|---|---|---|
| PC | 50 | 50 | 50 | 50 | 50 | 50 | 71.5 |
| SAMA-2 | 40 | — | — | 20 | — | — | 28.5 |
| SAMA-3 | — | 40 | — | — | 20 | — | — |
| SAMA-4 | — | — | 40 | — | — | 20 | — |
| ABS-5 | 10 | 10 | 10 | 30 | 30 | 30 | — |
| Izod Impact Strength, ft-lb/inch, room temperature | 10.8 | 12.2 | 6.5 | 10.8 | 10.8 | 10.3 | 1.3 |
| Heat Deflection Temperature, ⅛-inch, Injection Molded 264 psi, °F. | 218 | 215 | 209 | 194 | 194 | 191 | 239 |

The results set forth in Table III demonstrate that the blend compositions A-C according to the invention exhibit both good Izod Impact strength and a significantly high heat deflection temperature. Thus, these compositions exhibit an advantageous combination of properties. In contrast, compositions D-F which include greater amounts of ABS resin exhibit similar impact strengths but significantly lower heat deflection temperatures. The lower heat deflection temperatures exhibited by compositions D-F make these compositions less advantageous for use in various applications. Composition G which did not include any ABS resin exhibits a high heat deflection temperature owing to the polycarbonate and styrene components but exhibits a significantly lower impact strength owing to the poor compatibility of these components.

EXAMPLE 4

This example demonstrates the improvements in flexural strength and modulus exhibited by the polymer blend compositions of the invention. The blends of this example were prepared using polycarbonate (PC), SAMA-2, SAMA-3 or SAMA-4, and ABS-1. Blends A-C were prepared according to the present invention while blends D-F were prepared using greater than 20 weight percent of the ABS resin component. The amounts of the components in the blend compositions of this example are set forth in Table IV. The blend compositions were subjected to measurement of Izod Impact strength, heat deflection temperature, and flexural strength and modulus. The results of these measurements are also set forth in Table IV.

TABLE IV

|  | A | B | C | D | E | F |
|---|---|---|---|---|---|---|
| PC | 50 | 50 | 50 | 50 | 50 | 50 |
| SAMA-2 | 35 | — | — | 25 | — | — |
| SAMA-3 | — | 35 | — | — | 25 | — |
| SAMA-4 | — | — | 35 | — | — | 25 |
| ABS-1 | 15 | 15 | 15 | 25 | 25 | 25 |
| Izod Impact Strength, ft-lb/inch, room temperature | 28.2 | 9.8 | 2.5 | 11.5 | 9.6 | 8.7 |
| 0°F. | 21.5 | 8.1 | 1.2 | 9.3 | 8.2 | 5.9 |
| Heat Deflection Temperature 264 psi, °F. | 212 | 202 | 200 | 217 | 200 | 196 |
| Flexural Strength, psi | 12015 | 11750 | 11550 | 10063 | 9660 | 9475 |
| Flexural Modulus, psi × 100,000 | 3.6 | 3.5 | 3.5 | 2.9 | 2.9 | 2.9 |

The results set forth in Table IV demonstrate that the blend compositions A-C of the invention not only exhibit good impact strength and relatively high heat deflection temperatures but also exhibit improved flexural strength and flexural modulus. In contrast, the blend compositions D-F including greater amounts of ABS resin than included in the blends of the present invention exhibit significantly lower flexural strength and flexural modulus values. The combination of advantageous properties exhibited by the blends A–C of the invention demonstrate their suitability for use in various applications.

The preceding examples are set forth to illustrate specific embodiments of the invention and are not intended to limit the scope of the compositions of the invention. Additional embodiments and advantages within the scope of the claimed invention will be apparent to one of ordinary skill in the art.

What is claimed is:

1. A polymer blend composition, comprising:
   (a) from about 15 to about 65 weight percent polycarbonate;
   (b) from about 25 to about 75 weight percent of a styrene-acrylonitrile-maleic anhydride terpolymer, said terpolymer comprising from about 7 to about 20 weight percent acrylonitrile and not less than about 4 weight percent maleic anhydride; and
   (c) from about 4 to less than 20 weight percent of an ABS resin, based on the total weight of the polycarbonate, the terpolymer and the ABS resin, the ABS resin comprising a rigid graft polymer grafted to a diene rubber substrate and containing at least 40 weight percent of the diene rubber substrate.

2. A polymer blend composition as defined by claim 1, comprising:
   (a) from about 15 to about 65 weight percent of said polycarbonate;
   (b) from about 25 to about 75 weight percent of said styrene-acrylonitrile-maleic anhydride terpolymer; and
   (c) from about 4 to about 19 weight percent of said ABS resin.

3. A polymer blend composition as defined by claim 1, wherein the ABS resin comprises a rigid graft polymer including styrene and acrylonitrile grafted to a diene rubber substrate.

4. A polymer blend composition as defined by claim 3, wherein the diene rubber substrate comprises polybutadiene.

5. A polymer blend composition as defined by claim 3, wherein the ABS resin comprises at least 50 weight percent of the diene rubber substrate and the weight ratio of styrene to acrylonitrile in the rigid graft polymer portion of the ABS resin is in the range of about 1:1 to about 5:1.

6. A polymer blend composition as defined by claim 5, wherein the ABS resin comprises from about 50 about 75 weight percent of the diene rubber substrate.

7. A polymer blend composition as defined by claim 1, wherein the styrene-acrylonitrile-maleic anhydride terpolymer comprises from about 7 to about 20 weight percent acrylonitrile, from about 8 to about 25 weight percent maleic anhydride and a balance of stryene.

* * * * *